United States Patent [19]

Kuehn et al.

[11] 4,063,641
[45] Dec. 20, 1977

[54] TWO-SIDE LEGIBLE PACKAGING FILM AND PACKAGE MADE THEREFROM

[75] Inventors: Harold H. Kuehn, San Mateo; Peter M. Mittmann, Palo Alto, both of Calif.

[73] Assignee: Philip Morris Industrial Incorporated, Milwaukee, Wis.

[21] Appl. No.: 555,495

[22] Filed: Mar. 5, 1975

[51] Int. Cl.² .................. B32B 5/16; B65D 65/8; B65D 65/14; B65D 75/32; B65D 75/36

[52] U.S. Cl. .................. 206/484; 156/204; 156/277; 206/524.2; 426/87; 426/127; 426/383; 426/410; 428/35; 428/166; 428/200; 428/204; 428/349

[58] Field of Search .................. 428/35, 166, 200, 204, 428/207, 349; 426/87, 410, 383, 127; 156/227, 277, 204; 206/484, 484.2, 524.2, 524.6

[56] References Cited

U.S. PATENT DOCUMENTS

| | | | |
|---|---|---|---|
| 1,846,726 | 2/1932 | Isaacks | 156/227 |
| 2,275,579 | 3/1942 | Yanes | 156/277 |
| 3,028,070 | 4/1962 | Schnur et al. | 156/277 |
| 3,206,225 | 9/1965 | Oleson | 156/227 |
| 3,322,605 | 5/1967 | Frech | 156/277 |
| 3,386,645 | 6/1968 | Powell | 428/35 |
| 3,453,165 | 7/1969 | Isbey et al. | 156/277 |
| 3,462,329 | 8/1969 | Beyer | 156/277 |
| 3,549,451 | 12/1970 | Kugler | 156/277 |
| 3,607,519 | 9/1971 | Beyer | 156/277 |
| 3,749,623 | 7/1973 | Benoit | 156/227 |

FOREIGN PATENT DOCUMENTS

| | | | |
|---|---|---|---|
| 2,043,045 | 3/1972 | Germany | 156/204 |

Primary Examiner—J.C. Cannon
Attorney, Agent, or Firm—Donald G. Casser

[57] ABSTRACT

A flexible packaging film formed of two layers of transparent film joined together along superimposed inner faces wherein the inner face of each layer includes printed indicia, to thereby enable indicia to be legible from either side of the film. A particularly useful method for the manufacture of the film is also disclosed.

8 Claims, 11 Drawing Figures

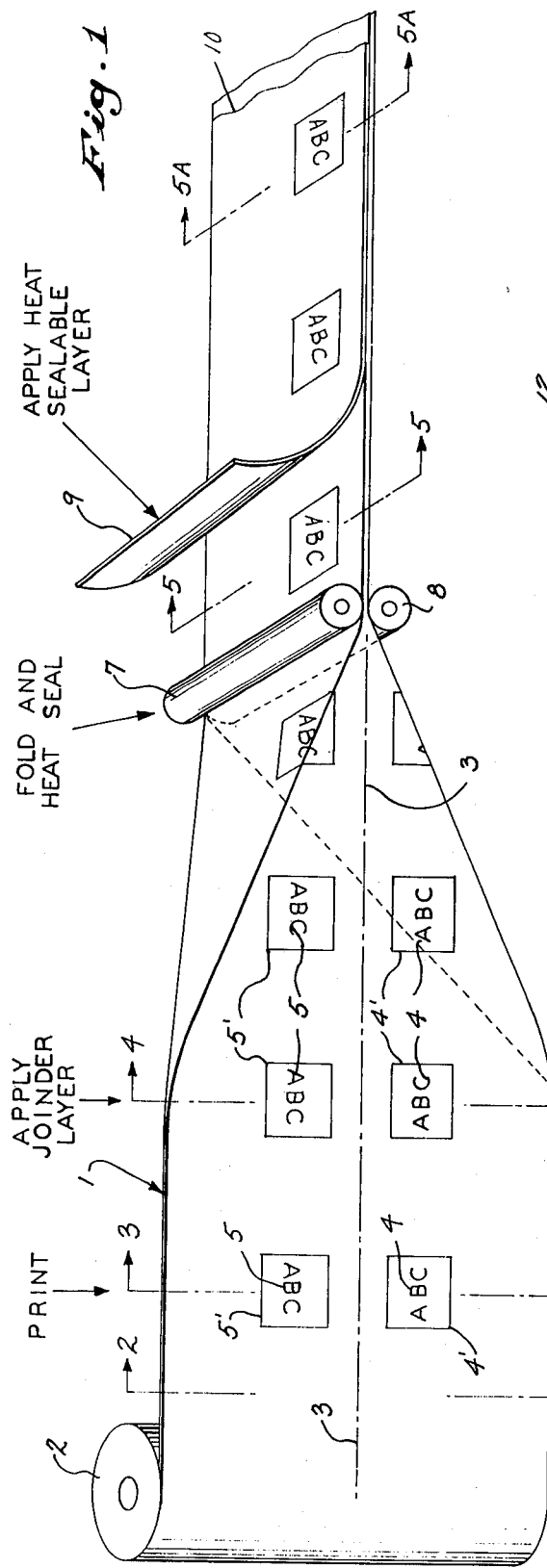
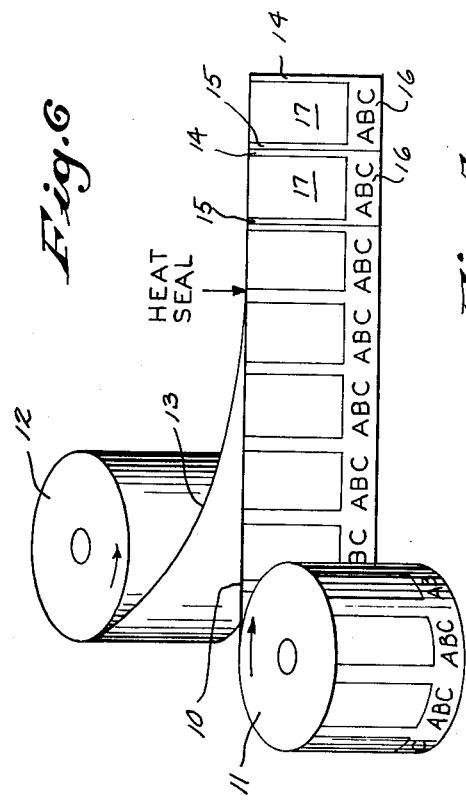
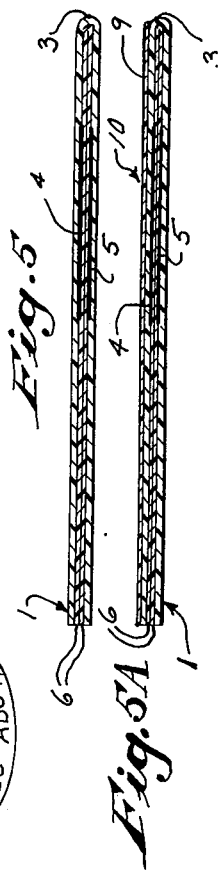
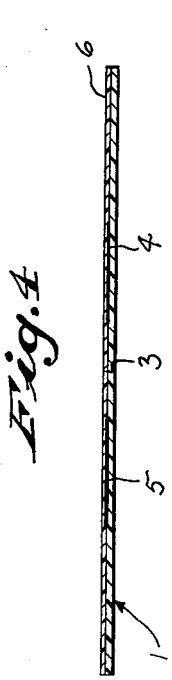
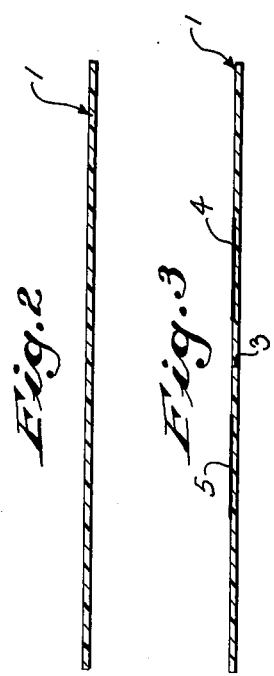

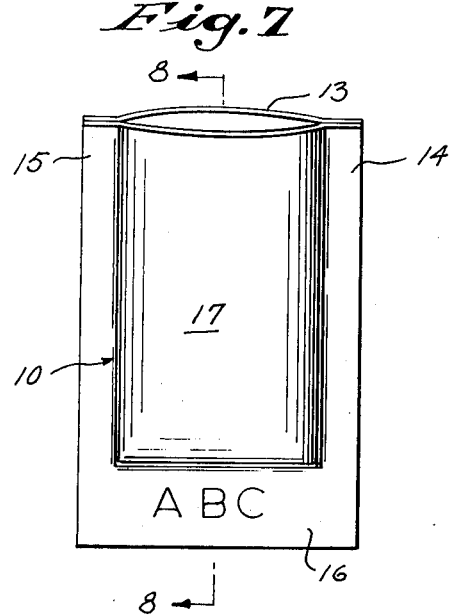
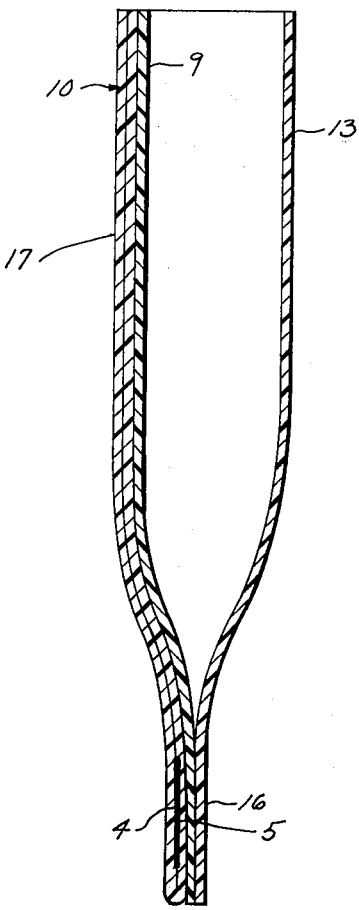
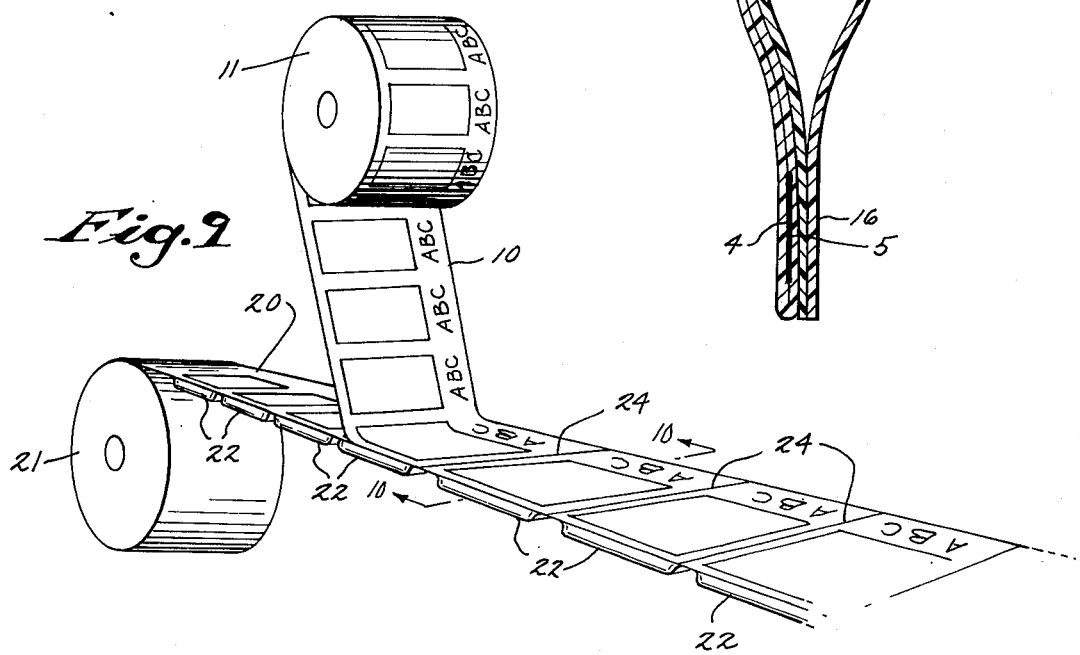
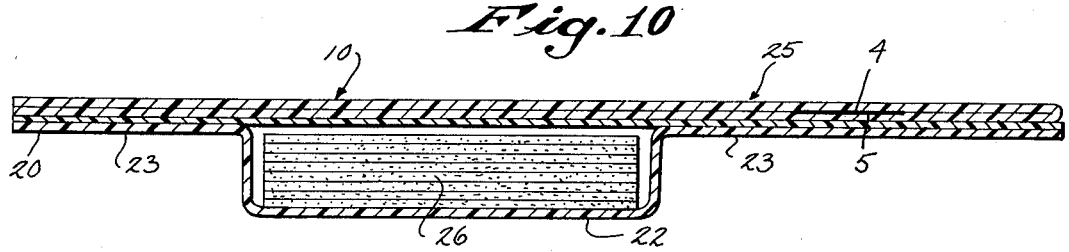

TWO-SIDE LEGIBLE PACKAGING FILM AND PACKAGE MADE THEREFROM

BACKGROUND OF THE INVENTION

1. Field

The present invention relates to printed packaging film and its method of manufacture in which the completed film has printed information that is visible from either side of the film.

2. Background

In many types of packaging applications, the packager desires to place his product in a receptacle that carries informative or decorative printed matter that can be seen from either side of the package. For example, many types of foods are packaged in a pouch made from flexible packaging film wherein two sheets of film are sealed together along contacting marginal portions to define the area within which the food is packaged; in this type of package, it is necessary that each sheet of film be separately printed when it is desired to provide information visible from both sides of the pouch. This package construction must normally be made in the plant of the package manufacturer or convertor and shipped as an empty package to the packager who then hand-fills and seals the pouch in his own plant. The construction thus tends to be expensive and the filling and sealing operations are generally slow and can require a good deal of hand work.

Many packagers in the food industries, particularly the meat industry, utilize in-plant packaging machines which are fed with rolls of flat packaging film that is formed into the desired package and then filled with product before being completely sealed. The most widely practiced equipment of this type is the so-called form-and-fill equipment, wherein one web, generally called the forming web, is fed through suitable apparatus and formed into trays in which the product is inserted and a second web, generally called the flat web, is thereafter fed over the top of the tray and sealed about its periphery to enclose the product. This type of equipment has enjoyed widespread use because of its convenience and the economies resulting from the ability of the packager to form his own packages by loading the machines with flat roll stock packaging film. However, this type of packaging equipment is incapable of handling two printed films and bringing them into superimposition in such fashion as to register printing material on each film. Thus, the machines require that one of the films in the package be unprinted and that all the printing be on the second film, generally the flat web, of the package. This has made it impossible for the packager to pack his goods in a container which will have printed information visible from both sides of the package and he is, at least as we are presently aware, forced to buy finished empty pouches from a package manufacturer as discussed above when he desires to make this type of package.

There thus exists a need among some packagers for a packaging film construction which will enable them to make a package on their in-plant form-and-fill packaging equipment that can have printed information visible from both sides of the package; such packagers receive maximum benefits if they can accomplish such end by using flat packaging film that can be directly fed to their form-and-fill equipment.

SUMMARY OF THE PRESENT INVENTION

Our present invention provides a flexible packaging film that includes two layers joined together in which each layer contains printed indicia. The printed indicia are arranged on the inner surface of each layer so as to be legible through the outer surface thereof, each layer being transparent over each indicia. This provides a flexible film wherein the same printed information is visible from either side. Our present invention also provides for packages made utilizing such film as one wall or member of a container and a second transparent film as the other wall or member of the container. The two-side legible packaging film of the foregoing construction may also include a layer of heat-sealable material over one of its surfaces in order that the film can be formed into packages by the usual heat-sealing techniques employed in the packaging art.

Our present invention also provides a method for the manufacture of the two-side legible packaging film described above. According to this method, printed indicia is applied along either side of the longitudinal centerline of an advancing web of film; a layer of joinder material is applied over the printed indicia; the web is folded along the longitudinal centerline so as to superimpose the printed indicia on one side of the centerline over that on the other side; and thereafter the contacting surfaces of the web are joined together to form the two-layer film. A heat-sealable layer can be applied over one surface of the folded, sealed web.

A principal object of this invention is to provide a flat web of flexible packaging film that carries printed indicia which can be visible from both sides of a package made from the film. Another is to provide a method which can be efficiently employed by the converter or packaging-film manufacturer to construct a two-side legible flexible packaging film of the type herein described. A further main object of the invention is to provide finished packages utilizing as one package element a flexible packaging film having indicia visible from either side of the film and using as the second package element a transparent packaging film which is joined to the first element in such fashion as to enable visual inspection of the printed indicia of the first element. More specific objects of this invention are to provide the particular details of two-side legible packaging film structure and methods for the manufacture of two-side legible packaging films as hereinafter claimed.

DESCRIPTION OF DRAWINGS

The present invention in its various aspects is described with reference to the accompanying drawings, wherein:

FIG. 1 schematically illustrates a sequence of steps in a method useful for the manufacture of the two-side legible film of the present invention;

FIGS. 2, 3, 4, 5 and 5A are transverse sectional views of the film illustrated in FIG. 1 taken along the respective sectional planes therein indicated;

FIG. 6 is a view showing the manufacture of flexible pouches from the two-side legible film of the present invention;

FIG. 7 is a plan view of the pouch of FIG. 6;

FIG. 8 is a sectional view of the pouch illustrated in FIGS. 6 and 7;

FIG. 9 illustrates the manufacture of form-and-fill containers utilizing the two-side legible film of the present invention; and FIG. 10 illustrates a finished container made as shown in FIG. 9.

DESCRIPTION OF PREFERRED EMBDIMENTS

A. FIGS. 1-5A

FIG. 1 is a schematic representation of various steps combined in accordance with a method of the present invention to form the novel two-side legible films of our invention. FIGS. 2-5A are sectional views showing the nature of the film at various stages of the method. FIG. 1 is a diagrammatic presentation of a typical process which can be practiced in-line as a succession of steps in the sequence presented, or the process can be carried out at several different locations with the materials moved from station to station.

As illustrated in FIG. 1, a web 1 of transparent flexible packaging film 1 is unwound from a supply roll 2 thereof and advanced through the processing steps next described. The film 1 as unwound from the supply roll has the structure shown in cross-section in FIG. 2; the film can be a single layer as shown, or it can be a multiple layer film, including laminated or coated constructions. The film 1 is shown as being advanced in its longitudinal direction along a datum line 3. The datum line 3 in the illustrated embodiment is the longitudinal centerline of the film, but the datum line can be positioned wherever desired on the film and it need not divide the web into equal portions as shown. The initial step is to apply indicia 4 and 5 on opposite sides of the datum line 3 of the film 1 along its upper or first surface. As indicated in the drawing, the two sets of indicia 4 and 5 are spaced equidistant from the datum line, measured perpendicular thereto; both indicia are the same, with the indicia 5 being rotated 180° relative to indicia 4 when printed on the first surface. The film at this stage has the construction shown in FIG. 3, wherein the printed indicia are exaggerated in size relative to the remainder of the film structure. Most usefully, each set of indicia includes printed matter ("ABC" in the drawing) printed on the surface of the film 1 and covered by an opaque background (4', 5') for the purpose discussed hereinafter.

The film 1 is next advanced past a second station at which joinder layer, preferably a heat-sealable material, can be applied onto the first surface of the film over the indicia. Any suitable apparatus may be utilized to apply the joinder layer, such as coaters or extruders, and the specific composition of the layer will depend on the nature of the film 1 being used and the type of heat-sealing properties which are desired. Polyolefins, urethane coatings, sarans and polyolefin copolymers (EAA and EVA), and other heat-sealable materials typically used in the converting art can be used for the joinder layer, as well as adhesive and cohesive materials. After the heat-sealable material is applied to the film, the film has the structure illustrated in FIG. 4 at this stage of construction wherein a joinder layer 6 of heat-sealable material is shown on the first surface of the film overlying the indicia 4 and 5.

Next, the film is folded upon itself upon the datum line 3 in such fashion that the indicia 4 and 5 are superimposed on one another. To accomplish this, the film is led between a pair of combining rollers 7 and 8. Either (or both) of the two rollers may be heated and suitable pressure applied in order that the two overlapping layers of the film 1 will be joined together in the specified relationship. After departing from the combining rollers, a film has the structure shown in the cross-sectional view of FIG. 5. The film has been folded longitudinally along the datum line 3 so that one half of the film is superimposed upon the other half with indicia 5 superimposed upon indicia 4, and the joinder layer 6 on each half of the film has been joined together to form the combined structure. The film 1 and joinder layer 6 are both of transparent material, and the printed indicia are positioned along an inner surface of the film, speaking now with reference to the combined structure; it will be appreciated that the indicia will be visible from either side of the film as shown in FIG. 5 of the film. The use of the opaque background, 4' and 5', over printed information helps to prevent the printed portion of indicia 4 and 5 from being visible through the opposite side of the film.

Thereafter, the film is advanced past suitable apparatus such as a coater or extruder, not shown, and a transparent heat-sealable layer 9 is applied over an exterior second surface of one of the layers of the film. The completed film 10 is shown in cross section in FIG. 5.

B. FIGS. 6-8

The construction of pouches from film 10 made as described above is illustrated in FIG. 7. The pouches are made starting with a supply roll 11 of the film 10, and a supply roll 12 of a transparent packaging film 13. The films 10 and 13 are each unwound from their respective rolls with the heat-sealable layer 9 of the film 10 positioned to contact the film 13, and led through a suitable heat-sealing station (not shown) at which their contacting marginal portions are heat-sealed together to define pouch containers 17. Individual pouches are cut from the combined films and a pouch 17 is shown in FIGS. 7 and 8. The side portions 14 and 15 and bottom portion 16 of the films 10 and 13 are shown as being heat-sealed together. The resulting pouch 17 has an open end through which goods to be packaged are inserted; thereafter the open end is sealed to close the pouch. Turning now to the sectional view of FIG. 8, the superimposed indicia 4 and 5 of the film 10 are located near the closed end of the pouch 17, and one set of indicia will be visible through the transparent outer layer of the film 10 when the indicia is viewed from the left in FIG. 8 and the other set will be visible through the transparent rear wall 13 of the pouch 17 and the transparent heat-sealable layer 9 of the film 10. The packager thus has available a pouch which has printed information visible from either side of the container. However, he can manufacture it readily in his own plant by starting with supply rolls of the film 10 and transparent web 12, and there is no need for him to obtain registration between two printed webs. Instead, suitable registration is carried out by the converter or film manufacturer when making the two-side legible film 10 in his manufacturing plant, and he will have suitable apparatus to obtain accurate registration. The film 13 need not be entirely transparent, but it should at least have a transparent portion through which the indicia would be visible in the completed container. For best visibility, the indicia would be positioned outside the product containing compartment defined between the two container members.

C. FIGS. 9-10

The manufacture of a container utilizing form-and-fill equipment and the two-side legible film 10 of the present invention is illustrated in the schematic drawings of FIGS. 9 and 10. Form-and-fill equipment includes suitable apparatus, generally a heated rotating cylinder, to which thermoplastic film is fed, heated so as to become softened, and then formed in shaped cavities into a tray-like container. Turning first to FIG. 9, a web 20 of transparent film is unwound from a supply roll 21 thereof and fed through the form-and-fill apparatus (not shown) and formed to have tray portions 22 which are to be the product containing compartments. Each tray portion 22 is surrounded by a peripheral flange portion 23. After being formed in this manner, the tray portions 22 are loaded with the desired goods, which may be meat, other food items, or various materials. The two-side legible web 10, unwound from a supply roll 11 thereof, is fed across the formed web 20 with the heat-sealable layer 9 of the film 10 placed in contact with the formed web 20. Marginal portions of the film 10 are thereafter sealed to contacting portions of the peripheral flange portion 23 surrounding each tray portion 22. After the heat-sealing operation, individual containers are severed from the two joined webs by cutting along a line between each tray portion 22 such as along the line 24 in FIG. 9. A completed container 25 is illustrated in sectional view in FIG. 10. One member of the container 25 consists of a formed portion of the web 20 and includes a tray portion 22 surrounded by the peripheral flange portion 23. This member of the container is transparent. The second member of the container 25 consists of a severed portion of the film 10 with its layer 9 heat-sealed to the flange portion 23 of the first member or transparent member of the container. The element 26 represents a commodity packaged in the container 25 within the commodity storage enclosure formed by joining together the two package members as described. The superimposed indicia 4 and 5 in the two-side legible web 10 are positioned along one side of the tray portion 22 of the container and will be visible through the top of the container through the transparent base film 1 and also visible through the bottom of the container through the transparent flange portion 23 of the second member of the container. In this manner, the packager who has form-and-fill equipment in his plant is able to use the two-side legible film 10 of the present invention as the flat or non-formed web on such equipment and have the benefits of a legend which can be seen from both sides of his finished container without having to obtain accurate registration between two printed webs.

The base film 1 utilized in the construction of the two-side readable film 10 of the present invention may be any of the transparent flexible packaging films typically used in the packaging art, such as, for example, polyethylene films, polypropylene films, vinyl films, polyester films, and cellophane and other cellulosic ester films. The base film itself may be a single layer film or a multiple layer film comprising two or more similar or dissimilar layers, either as laminations or coatings. For normal uses, the film 1 may be in the range of ½ to 10 mils thick, although thinner or thicker materials can be used if necessary or desired for a particular packaging application. The term "heat-seal" as used herein refers to the process or property of softening or fusing to form a bond between contacting portions of material upon momentary application of heat and pressure. Temperatures used in heat sealing are above the softening temperatures of the material or layer being heat-sealed, pressures generally varying from between about 1 to 50 lbs. per sq. in. or more, and the dwell time during which the contacting material is subject to the applied heat and pressure is normally from a fraction of a second to several seconds. With reference to the joinder layer 6 disclosed above, the use of heat-sealable material for such joinder layer is preferable because of its comparative ease of manufacture; however, in an appropriate instance, various adhesives may also be employed for the joinder layer. The heat-sealable layer 9 of the film 10 may be any of the heat-sealable materials typically used in the packaging art, such as, for example, low density polyethylene materials, olefin copolymer materials such as ethylene-vinyl acetate copolymer, heat-sealable saran, various heat-sealable lacquers or coatings, and blended compositions; the specific material should be chosen with respect to the strength of heat seals required in the finished package and the heat-sealing conditions to be used to process the finished film. In the situation in which the base film 1 of the film is a heat-sealable material itself, such as various polyethylenes, the exterior heat seal layer 9 may not be needed in the final construction. It is contemplated also that either the joinder layer 6 or heat-sealable layer 9, or both, can be applied as patterned layers or strips of material instead of the continuous layers shown in the drawings. As a specific example of the film 10 that has proved satisfactory in the practice of our invention, a web of 50-gauge saran coated polyester film (Mylar) was used as the base film, and indicia were printed onto the saran surface thereof, a heat-sealable lacquer was applied as the joinder layer 6 over the printed saran surface of the base film, the film was laminated to itself along such lacquer, and polyethylene was extruded over the exterior surface of the film on one side to form the heat-sealable layer 9.

The present invention has been described hereinabove in its various aspects, i.e., film, container, and method, by reference to certain illustrative best modes presently contemplated for its practice and in terms that will enable those skilled in the art of packaging film manufacture to practice the invention; it is expected that those skilled in such art will be able to devise modifications and variations of the disclosed embodiments that will remain within the scope of our present invention.

We claim:

1. A flexible packaging film comprising, in combination:
    a first layer of transparent material, and first printed indicia on a first surface thereof,
    a second layer of transparent material, and second printed indicia on a first surface thereof,
    said first and second layers being joined together with their respective first surfaces in contact with and essentially continuously joined to each other over the whole of their facing surfaces and with the first indicia legible through the first layer and the second indicia legible through the second layer.

2. A flexible packaging film according to claim 1, wherein:
    the first and second layers of the film each includes a joinder layer of heat-sealable material on their respective first surfaces, and the first and second layers are joined to each other along said heat-sealable material.

3. A flexible packaging film according to claim 1, further including:
    an exterior heat-sealable layer on one of the first and second layers on an exterior second surface thereof opposite from its first surface.

4. A flexible packaging film according to claim 2, further including:
   an exterior heat-sealable layer on one of the first and second layers on an exterior second surface thereof opposite its first surface.

5. A flexible packaging film according to claim 1, wherein:
   each printed indicia consists of printed information applied to the first surface of each layer and an opaque background overlaying the printed information.

6. A packaging container comprising two members joined together to define a commodity storage compartment, wherein:
   1. the first member is a transparent packaging film,
   2. the second member is a two-side legible film consisting of first, second and third layers joined together,
      a. the first layer being joined to the second layer along contacting surfaces thereof,
      b. the first and second layers each having printed indicia on their said contacting surfaces, with the indicia on a layer being legible through its surface opposite from said contacting surfaces,
      c. the third layer consisting of transparent heat-sealable material,
   3. portions of the third layer of the second member being heat-sealed to the first member to define a product containing compartment therebetween.

7. A packaging container according to claim 6, wherein the first and second members form a pouch container.

8. A packaging container according to claim 6, wherein the first member is formed to have a tray portion surrounded by a peripheral flange portion, and the second member is flat and its third layer is heat-sealed to the first member along the peripheral flange portion thereof.

* * * * *